Aug. 25, 1931.    F. J. O'BRIEN    1,820,479
CASING SLIP
Filed Jan. 28, 1930
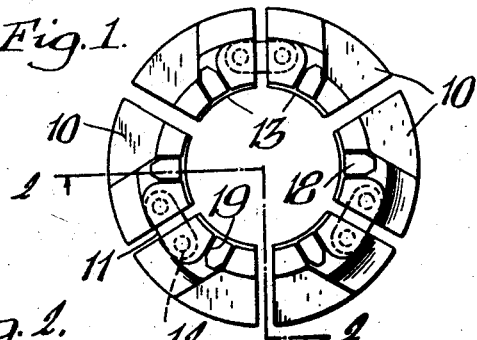
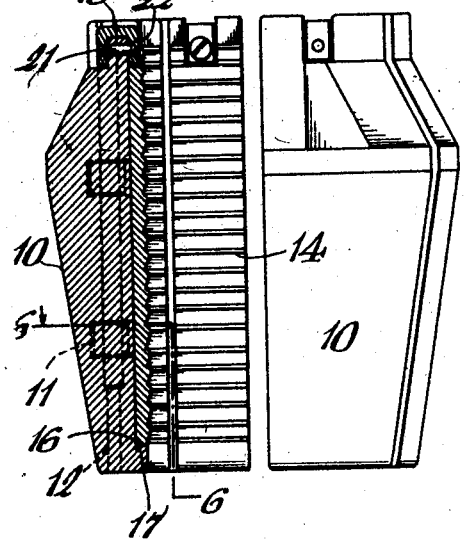
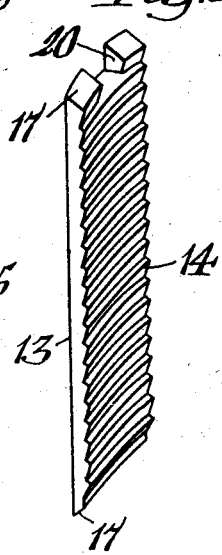
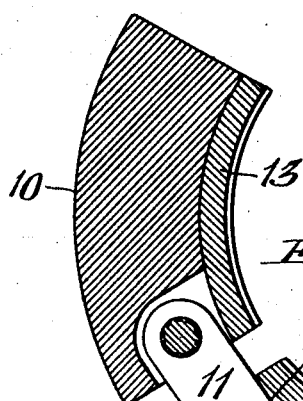
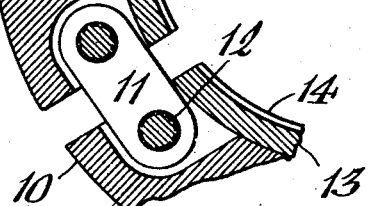
Inventor,
Frederick J. O'Brien,
by Walter P. Geyer
Attorney.

Patented Aug. 25, 1931

1,820,470

UNITED STATES PATENT OFFICE

FREDERICK J. O'BRIEN, OF TITUSVILLE, PENNSYLVANIA, ASSIGNOR TO STRUTHERS WELLS-TITUSVILLE CORPORATION, OF TITUSVILLE, PENNSYLVANIA, A CORPORATION OF MARYLAND

CASING SLIP

Application filed January 28, 1930. Serial No. 424,089.

This invention relates to improvements in the casing slips or pipe gripping devices employed for supporting the drill pipe of rotary drilling apparatus.

One of its objects is to provide a casing slip of this character whose gripping or toothed faces are readily replaceable in the slip-bodies, thereby affording a material saving in the maintenance costs of these devices.

Another object of the invention is the provision of a casing slip including a replaceable liner having simple, inexpensive and reliable means for interlocking the liner therewith against both lateral and circumferential displacement.

Other features of my invention reside in the novel construction and arrangement of parts hereinafter described and particularly pointed out in the appended claims.

In the accompanying drawings:—

Figure 1 is a top plan view of a casing slip embodying my invention. Figure 2 is an enlarged cross-section thereof taken on line 2—2, Figure 1. Figures 3 and 4 are perspective views of a slip-body and its replaceable liner, respectively. Figure 5 is a perspective view of the anchoring clip for the liner. Figure 6 is a fragmentary horizontal section taken in the plane of line 6—6, Figure 2.

Similar characters of reference indicate corresponding parts throughout the several views.

In the preferred embodiment of the invention shown in the drawings, the casing slip is composed of a plurality of slip units adapted for engagement with the tapered opening of the customary table or spider bushing (not shown), the pipe or casing extending through these slip units and suspended from them in the usual manner. As seen in Figure 1, each slip unit consists of a plurality of sectors 10, two being shown in the drawings, which are spaced radially and connected with each other adjacent their upper and lower ends by links 11 pivoted to pivot rods or pintles 12 carried by the sectors.

Applied to the inner face of each of the slip-sectors 10 is a replaceable pipe-gripping member or liner 13 of uniform thickness throughout its length and provided with threads or wickers 14 to prevent the pipe from slipping downwardly relatively thereto. The inner face of the slip-sector has a groove 15 therein for receiving the companion liner, the upper and lower edges of the groove being undercut to provide oppositely facing shoulders, as indicated at 16, and the corresponding edges of the liner being tapered or beveled, as indicated at 17, whereby the liner is reliably held to its slip-sector against lateral displacement.

The liner is detachably held against circumferential displacement relative to the slip-sector by means of a readily removable clip or clamp applied to the upper end of the sector. This clamp preferably consists of a substantially U-shaped member 18 adapted to be seated in a radial notch or recess 19 formed in the top of the slip-sector, as shown in Figure 3, said notch extending around the contiguous sides of the sector and intersecting the groove 15 in the inner face of the latter. The top of the liner 13 has a notch 20 therein disposed to register with and form a continuation of the notch 19 in the slip-sector and the inner leg of the clamp 18 is adapted to extend into this liner-notch in the joined position of the parts. A bolt or cotter pin 21 serves to hold the clamp in place on the slip-sector and the bolt-receiving hole in said clamp is counter-bored, as seen at 22, so that the head of the bolt does not interfere or project beyond the toothed gripping face of the liner.

In the application of the replaceable liner to the slip-sector, the former is inserted in the receiving groove 15 in the latter, the clamp 18 is slipped over the notched upper ends of the companion parts and the bolt screwed in place. The removal of the slip is just as readily effected by the reversal of these operations.

I claim as my invention:—

1. A casing slip of the character described, comprising a body having an upwardly-facing shoulder on its inner face and adjacent the lower end thereof, a replaceable liner including pipe-gripping means applied to its inner face and seated at its lower end on said shoulder, the upper end of the liner having a notch therein, and a clip secured to said body and having a part engaging said notch for preventing displacement of the liner relative to the body.

2. A casing slip of the character described, comprising a body having an upwardly-facing shoulder on its inner face and adjacent the lower end thereof, a replaceable liner including pipe-gripping means applied to its inner face and seated at its lower end on said shoulder, the upper end of the body and the liner having alining notches therein, and a retaining clip detachably fitted in the body-notch and having a part engaging said liner-notch.

3. A casing slip of the character described, comprising a body having a groove in its inner face, the upper and lower edges of said groove being undercut, a replaceable-liner including pipe-gripping means applied to its inner face and having its upper and lower edges beveled to engage the corresponding undercut edges of the body-groove, the upper edge of the liner having a notch disposed transversely thereof, and a retaining clip detachably applied to the upper edge of the slip-body and having a part disposed to engage the notch in the upper edge of the liner to hold it against transverse displacement in the body-groove.

4. A casing slip of the character described, comprising a body having a groove in its inner face, the upper and lower edges of said groove being undercut, a replaceable liner including pipe-gripping means applied to its inner face and having its upper and lower edges beveled to engage the corresponding undercut edges of the body-groove, the upper edge of said slip-body having a notch therein communicating with its groove and the corresponding edge of the liner having a notch therein arranged to register with said body-notch, and a retaining clip applied to the body-notch and engaging said liner-notch.

5. A casing slip of the character described, comprising a body having a groove in its inner face, the upper and lower edges of said groove being undercut, a replaceable liner including pipe-gripping means applied to its inner face and having its upper and lower edges beveled to engage the corresponding undercut edges of the body-groove, the upper edge of said slip-body having a notch therein communicating with its groove and the corresponding edge of the liner having a notch therein arranged to register with said body-notch, and a substantially U-shaped clamp detachably seated in the body-notch, one of its legs engaging the liner-notch to hold the liner against transverse displacement in the body-groove.

FREDERICK J. O'BRIEN.